UNITED STATES PATENT OFFICE.

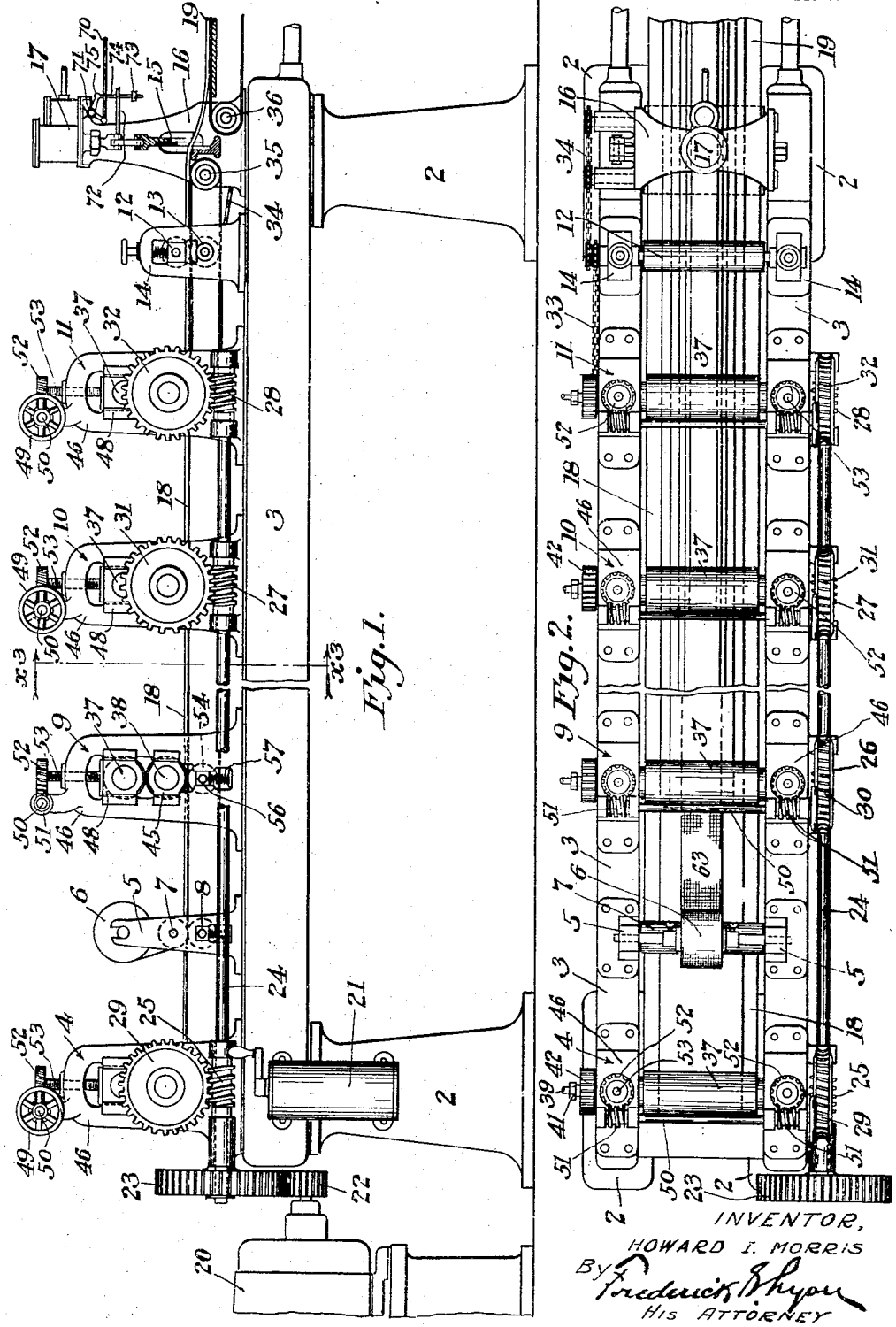

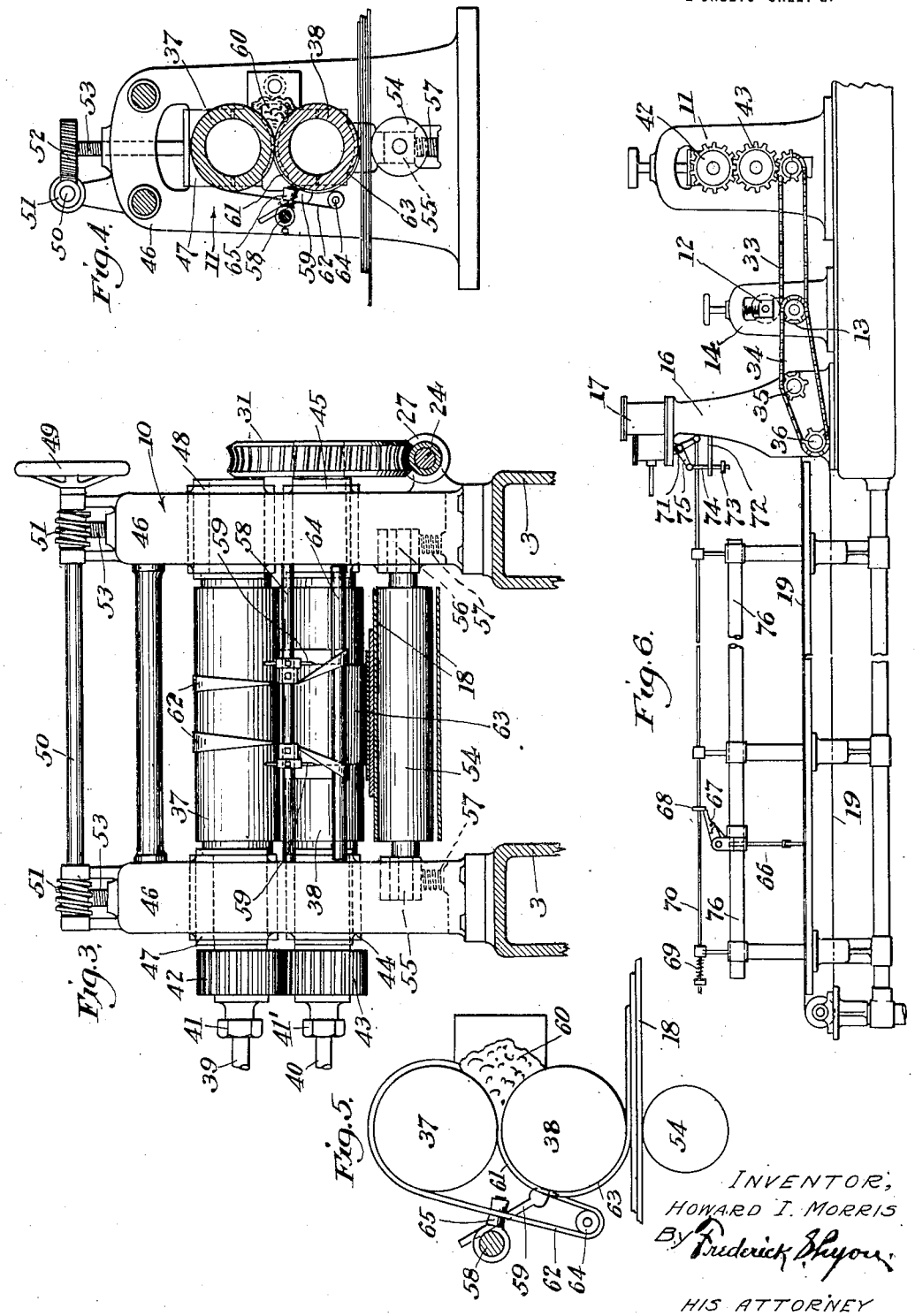

HOWARD I. MORRIS, OF LOS ANGELES, CALIFORNIA, ASSIGNOR, BY DIRECT AND MESNE ASSIGNMENTS, TO MORRIS TIRE MACHINERY COMPANY, A CORPORATION OF CALIFORNIA.

METHOD AND MACHINE FOR MAKING THE RUBBER ELEMENTS FOR TIRES, LAMINATED TIRE-TREADS, &c.

1,353,934.   Specification of Letters Patent.   Patented Sept. 28, 1920.

Application filed December 29, 1917. Serial No. 209,386.

*To all whom it may concern:*

Be it known that I, HOWARD I. MORRIS, a citizen of the United States, residing at Los Angeles, in the county of Los Angeles and State of California, have invented a new and useful Method and Machine for Making the Rubber Elements for Tires, Laminated Tire-Treads, &c., of which the following is a specification.

This invention relates to means by which either laminated tire treads for rubber tires, and more particularly for pneumatic tires, or complete rubber elements for such tires, may be formed and completed ready for application to the carcass or fabric body portion of tires, either in the original manufacture of such tires or for repair of retread purposes; to means for the production of such rubber elements as a complete and distinct product ready for application to the body of the tire.

This invention further relates to machines or apparatus not only for making laminated rubber tire treads but also for combining therewith the cushion sheet or strip and the breaker strip; it also relates in its further development to apparatus which not only plies up or combines the cushion strip, breaker strip and laminated tire tread, but also automatically adds thereto the side walls, thus automatically completing what may be termed the entire rubber element which is mounted upon the carcass of the tire.

The various objects sought and attained will more fully and at large appear from the appended detail description of a preferred embodiment of a machine or apparatus embodying the invention as incorporating all of these features, and such preferred embodiment will be more readily understood by reference to the accompanying drawings forming a part of this specification and in which—

Figure 1 is a side elevation of a machine or apparatus of such preferred embodiment or form of the invention, a portion being broken away to show that the duplication of parts is not illustrated in the drawings.

Fig. 2 is a plan view thereof.

Fig. 3 is a transverse sectional view on the line $x^3$—$x^8$, of Fig. 1.

Fig. 4 is a sectional view of one of the calenders.

Fig. 5 is a detail view diagrammatically illustrating one of the calenders and the means for cutting or trimming the sheet or strip of rubber produced thereby and means for returning the waste strip or strips produced by such trimming to the mass of rubber fed to the calender and the relation of the pressure roll and the conveyer to the lower calender roll.

Fig. 6 is a side elevation illustrating more particularly the means for cutting the completed laminated tread or rubber element into predetermined lengths, a portion of the plying mechanism being broken away and only the last calender and the final pressure rolls of the apparatus being shown, illustrating the preferred means for driving the final pressure rolls from the last calender roll and for simultaneously driving the conveyer onto which the completed tire treads or rubber elements are delivered and preferably measured and automatically cut into the desired lengths.

In this preferred embodiment of the invention which not only provides for the plying up of the laminated tread portions proper but also the addition thereto of the breaker strip and the cushion sheet or strip and the side walls, 2 indicates the usual frames or pedestals upon which the main frame 3 of the machine is mounted. 4 represents a calender whose particular function is the rolling of a sheet of soft pliable rubber to be used as the cushion sheet which, when the tire element is mounted on the tire, adheres directly to the carcass of the tire. 5 represents a suitable frame mounted upon the main frame of the machine and carrying a supply roll 6. This roll carries the breaker fabric which is preferably a suitable fabric impregnated with rubber. This frame also carries a pair of pressure rolls 7—8 one of which, preferably the lower, is under yielding spring pressure. 9 and 10 represent respectively two of a plurality of calenders which roll the successive plies of the tread and ply them up or build them one upon another successively as the product of the machine or tread or, in the case of the completed machine shown in the drawings, the rubber element of the tire, is carried along through the machine. 11 represents another calender and its particular function is to roll the sheet of rubber which forms the side wall of the rubber element. In connection with this calender means are provided for cutting the sheet of rubber produced thereby into two strips of proper width and properly positioned so that they are delivered onto the element being formed by the machine and pressed into place thereon. 12 and 13 represent the final pressure rolls and are suitably mounted in a frame 14. One of these rolls is preferably adjustable toward and away from the other and maintained under suitable spring pressure.

In the drawings I have illustrated the upper roll as adjustable toward and away from the lower roll and the tension spring as mounted between the bearings of the upper roll and the frame 14. The purpose or function of these final pressure rolls is to give the product thus plied up a final and firm pressure to insure the various plies thoroughly adhering one to another.

Mounted upon the frame 3 and in line with the various calenders and final pressure rolls is a knife or shear 15. This is mounted on a suitable frame 16 and operated by automatically controlled means as hereinafter described in detail. The frame 16 preferably carries a cylinder 17 in which is mounted a fluid-actuated piston which carries the knife 15. 18 represents an endless conveyer belt. The upper leg of this conveyer runs between the lower or pressure roll of the respective calenders and the lower roll of the calenders and between the pressure rolls 7 and 8 of the breaker strip plying means and between the final pressure rolls 12 and 13. By means of this belt the product of the machine is supported and carried along so that the feed of the product is positive and any tendency of the forming rubber element or tread to stretch while being formed is reduced to a minimum.

19 represents a second continuous conveyer or belt arranged preferably slightly below the conveyer belt 18 and upon this conveyer belt the completed strip of rubber element or laminated tread is received. When the apparatus is provided with the automatic means for cutting the rubber element or tread into predetermined lengths this means, such as the knife 15, is preferably mounted between the ends of the conveyers 18 and 19 so that the strip passes into position for the operation of the knife as it passes onto the second conveyer 19.

20 represents diagrammatically a suitable motor which may be of any preferred construction such, for example, as an electric motor, and 21 represents a controller for the same. In the drawings this motor is represented as geared through the pinion 22 and gear 23 to the shaft 24 which extends longitudinally of the machine and carries a series of worms 25, 26, 27 and 28 which engage with suitable gears 29, 30, 31 and 32 carried by the respective calender rolls and through which the latter are driven.

The pressure roll of the calender 11 is provided with a sprocket (see Fig. 6) and about this sprocket a chain 33 passes about a sprocket on one of the rolls of the final pressure rolls. A second sprocket chain 34 passes about a sprocket preferably of this same roll of the final pressure rolls and over a sprocket 35 on the roll of the first conveyer belt 18 and thence over a sprocket on the end of the roll 36 on the second conveyer 19. It is thus seen that the two conveyers 18 and 19 are preferably driven at the same speed and preferably from a common source.

Referring to Figs. 3, 4 and 5 the preferred construction of calender will be understood. Rolls 37 and 38 may be of any ordinary or preferred construction and material. They are hollow and may be continuously or initially heated by steam or other suitable medium or may be cooled by the circulation of water within them as required. The means for admitting such circulating medium may be by pipes 39 and 40 which enter suitable stuffing boxes 41 and 41'. The speed of the rolls 37 and 38 is maintained in a constant definite relation to each other by the gears 42—43. The bearings 44—45 of the roll 38 are preferably held in stationary position in the frame 46 while the bearings 47 and 48 of the roll 37 are preferably slidably mounted in the frame 46 and may be moved up or down by means of the hand wheel 49, shaft 50, worms 51, worm gears 52 and screws 53 so that any required adjustment of the distance between the rolls 37 and 38 may be provided to roll the rubber sheet or strip into the required thickness. Directly beneath the roll 38 is mounted a pressure roll 54. This roll 54 is mounted in slidable bearings 55 and 56 in the frame 46 and these bearings are preferably constantly pressed upward by springs 57.

The conveyer belt 18 passes between the calender roll 38 and the pressure roll 54 and is held in resilient contact with the roll 38 by means of the pressure of the roll 54 against its under surface. A bar 58 is mounted between the two sides of the frame 46 and upon this bar are adjustably mounted knives 59 so positioned that their cutting edges bear against or in close proximity to the periphery of the roll 38. These knives are for the purpose of cutting or trimming the sheet of rubber into strips of predetermined widths.

In Fig. 5 the mass of rubber shown at 60 is fed between the calender rolls 37 and 38 which roll it into a sheet 61 which then passes under the knives 59 to cut the sheets into strips 62 and 63. The strips 63 pass around the roll 38 and between the roll 38 and the conveyer belt 18. In the particular illustration of Fig. 5 the strip 63 is shown as applied upon a strip on the conveyer 18, it being assumed in such figure of the drawings that one strip has already been delivered onto the surface of the conveyer 18 before such conveyer has reached this particular calender. The strips 62 would form waste strips or trimmings and it is preferable to reconvey these back to the mass 60. For this purpose I provide a roll 64 which is mounted upon suitable bearings on the frame 46. From this roll 64 these waste strips or trimmings pass over rollers 65 which are adjacent to the knives and also are adjustably mounted upon the bar 58. These rollers 65 deflect the strips 62 inward so that the strips pass over the roll 37 and back into the mass of rubber 60 toward the center of such mass.

In Fig. 6 I illustrate one form of mechanism for operating the automatic knife or shear 15 for cutting the treads or rubber elements into predetermined lengths. This means consists of a cylinder 17 which has a piston (not shown). This piston is connected to the knife 15 by a suitable piston rod and connecting rod and is preferably operated by compressed air, but it will be understood that the same result may be accomplished by other operating mechanism actuated by steam or electricity.

At 66 is shown a trigger mechanism which is operated by the end of the rubber tread or rubber element striking thereagainst as it travels along the conveyer belt 19 and causes the pawl 67 to be disengaged from the collar 68, whereupon the spring 69 pulls the rod 70, thereby operating a master valve 71 connected with the main valve chamber, which in turn actuates the main valve to admit air to the cylinder 17 above the piston, causing the shear to be pushed downward and then automatically returned to its upper position, thus shearing off the rubber tread or rubber element. As the piston travels upon its downward stroke it carries the arm 72 which is mounted upon the piston rod with it and this arm 72 striking the collar 73 on the rod 74 operates the bell crank 75 on the master valve 71 which then closes the master valve 71 and at the same time pulls the rod 70 back to its initial position, whereupon the pawl 67 again engages the collar 68 and the entire shearing mechanism is again set ready for another operation. The length of the tread may be varied by adjusting the position of the trigger mechanism along the supporting rod 76.

It is obvious that the number of calenders 9, 10 used in such a machine will correspond to the number of plies or strips of rubber that are required to make up the tread portion proper.

In the operation of this preferred form of my invention a suitable supply of rubber is furnished to the calender 4 and the calender 4 is maintained at the desired temperature so that the strip of rubber produced thereby is heated to the desired heat. If in the operation of the calender the friction of the rubber through the same tends to overheat it instead of supplying steam to the calender the calender rolls may be cooled by water so that the desired temperature of the rubber is maintained. The calender 4 produces a sheet of rubber which, after passing through the knives and cut or trimmed into a strip of the desired width, the center strip thus formed is brought down onto the surface of the conveyer 18 and by such conveyer is carried between the pressure rolls 7, 8. As it passes between these rolls it receives the breaker strip from the supply roll 6 and is rolled into firm contact therewith by the pressure rolls 7, 8. Two plies then are carried forward by the conveyer 18 successively through a number of tread-plying calenders 9, 10 and at each calender receive an additional ply or strip which ply or strip is rolled into firm contact with the preceding plies by the pressure of the respective pressure rolls 54 of each calender. It is to be noted that with this arrangement each ply as it comes from the respective calender is brought down on to the partially completed element at the instant the same enters between the pressure roll 54 and the lower calender roll, so that all possibility of the formation of air pockets is eliminated. The knives of each succeeding calender are preferably set to cut a narrower strip of rubber than the one just preceding so that as the strips are plied one upon another the tread is given a pyramidal form. This form, however, may be varied as desired.

After passing through the series of tread calenders the plies or partially formed elements reach the calender 11 where two strips of side wall rubber are plied upon the first or cushion ply at the edges of the widest of the tread plies. The element thus formed then passes between the pressure rolls 12 and 13 where it receives its final pressure, insuring a perfect adhesion of all the plies. It then passes on through the automatic shear and on to the conveyer belt 19 where the end strikes the trigger mechanism and operates the automatic shearing mechanism, cutting it into predetermined lengths as heretofore stated. It will be seen that each ply is added to the preceding ones by a rolling contact which prevents the possibility of trapping air between the plies, thus avoiding air pockets in the tread which would cause defects in the tire. This has ben found to often occur where treads are built up by hand.

It is obvious that various modifications may be made in this machine and various mechanical equivalents employed for the different elements thereof without departing from my invention and I, therefore, do not limit myself to the exact form or construction of elements shown.

From the foregoing description of my invention it is obvious that I produce a distinct product, to wit, a rubber element or a laminated tread (as desired) as a completed product ready for application to the body or to the carcass of a tire. Such element is, therefore, ready for application either in the manufacture of a new tire or in the repair or retreading of used tires. It is also obvious that by this means and method I produce a very superior article as I eliminate all chances of the formation of air pockets in the various plies of the rubber element and obviate all defects which ordinarily occur where the rubber element is built onto the body or carcass by hand.

It is obvious that with my process and with the general interrelation of apparatus hereinbefore described not only a single tire element or laminated tread may be formed at one time, but if desired the calenders and conveyers may be made of sufficient width so that two or more rubber elements or laminated treads may be completed simultaneously. In order to thus produce two or more tire elements or treads upon the same apparatus at the same time it would simply be necessary to provide calenders and conveyers of sufficient width and to duplicate the knives for cutting the sheet produced by the respective calender into the desired number of strips of the desired widths and return to the rubber mass that portion of the original sheet produced by the respective calender which lies between the used strips. This return to the mass may be effected by simple duplication of the parts hereinbefore described for that purpose.

It is obvious of course that the invention is in no manner limited to the actual return of such portions to the rubber mass. These portions and the portions trimmed from the edges where simply a single element or tread is made, or from the extreme edges of the strip produced by the calender when used for making a plurality of treads or elements, may be simply allowed to go to waste and drop to the floor or to any suitable waste receptacle.

The process or method herein described and performed by my apparatus is not claimed herein but forms the subject matter of a separate application.

I claim:

1. A plurality of calenders for rolling strips of rubber, a conveyer passing successively under said calenders, and pressure means for plying the strips as delivered to said conveyer from said calenders.

2. A conveyer, a plurality of calenders arranged along said conveyer and adapted to roll strips of rubber and ply the same one on the other on said conveyer, and pressure means for pressing the strips as the same are plied.

3. A conveyer, a plurality of calenders arranged along the conveyer and adapted to roll strips of rubber and successively ply the same one on another on said conveyer, and pressure means in connection with said calenders for pressing the plied strips between such conveyer and the lower roll of the calender.

4. A conveyer, a plurality of calenders arranged along said conveyer and adapted to roll and trim strips of rubber and successively ply the same one on another on said conveyer, and pressure means for pressing said strips as plied.

5. A plurality of calenders for rolling strips of rubber, means for successively plying said strips and pressing the same, and means for automatically cutting the product into predetermined lengths.

6. A plurality of calenders for rolling and trimming strips of rubber, means for successively plying said strips and pressing the same, and means for automatically cutting the product into predetermined lengths.

7. A plurality of calenders for rolling and trimming strips of rubber, means for returning the waste to the calender feed, and means for successively plying said strips and pressing the same.

8. A conveyer, a plurality of calenders arranged along the same, and pressure rolls arranged underneath respective calenders and between which and a roll of the calender the conveyer passes.

9. A conveyer, a plurality of calenders arranged along the same, and means beneath each calender for pressing the plied strips from the respective calenders as the conveyer passes beneath the same.

10. A machine for forming the rubber element of tires, comprising a conveyer, a calender arranged to deliver a cushion strip onto said conveyer, means for supplying a breaker strip onto said cushion strip, means for pressing said strips together, and means for producing and supplying additional strips of rubber thereonto and pressing the same together as supplied thereto.

11. A machine for forming the rubber element of tires, comprising a conveyer, a calender arranged to deliver a cushion strip onto said conveyer, means for supplying a breaker strip onto said cushion strip, means for pressing said strips together, a series of calenders arranged along said conveyer and adapted to roll strips of rubber and ply the same successively to the said element as carried by said conveyer, and means for pressing each strip into the partially formed element as it is delivered thereto by said calender.

12. A machine for forming the rubber element of tires, comprising a conveyer, a calender arranged to deliver a cushion strip onto said conveyer, means for supplying and plying a breaker strip thereto, means for producing and supplying tread strips thereto and pressing the same thereinto, and automatic means for cutting the element into predetermined lengths.

13. A machine for forming the rubber element of tires, comprising a conveyer, a calender arranged to deliver a cushion strip onto said conveyer, means for supplying and pressing a breaker strip thereto, means for supplying tread strips thereto and pressing the same together, and means for producing and pressing side-wall strips thereto.

14. In a machine for forming the rubber element of tires, a conveyer, a calender arranged to deliver a cushion strip onto said conveyer, means for supplying and pressing a breaker strip thereto, a series of calenders for providing and applying successive tread strips thereto, means for pressing said strips thereto as applied, and means for providing and pressing thereto side-wall strips.

15. A machine for forming the rubber element of tires, comprising a conveyer, means arranged to produce and deliver a cushion strip onto said conveyer, means for supplying and pressing a breaker strip thereto, means for producing and supplying tread strips thereto and pressing the same together, and means for producing and supplying and pressing side-wall strips thereto.

16. In a tread making machine, a plurality of calenders for rolling sheets of rubber, means for cutting the sheets of rubber produced into strips of predetermined widths, a conveyer belt for the purpose of carrying the strips of rubber from each calender to the ones succeeding, and means for superimposing one strip of rubber upon another as it passes upon the conveyer belt.

17. In a machine for making the rubber element of pneumatic tires, means for calendering rubber sheets, means for cutting the sheets into strips, and means for plying the strips one upon another in progressive order directly from the calendering means.

18. In a machine for making the rubber element of pneumatic tires, means for calendering rubber sheets, means for cutting the sheets into strips, means for plying the strips one upon another in progressive order directly from the calendering means, and means for inserting between said rubber strips a breaker strip.

19. In a tread making machine, a plurality of calenders, each calender having a yielding pressure roll, a conveyer belt passing between the yielding pressure roll and one roll of each of the calenders, means for cutting a sheet of rubber into strips of predetermined widths, means for superimposing one strip upon another in laminated form upon said conveyer belt and rolling each strip into firm contact with the preceding strips as they pass between calender roll and pressure roll.

Signed at Los Angeles, California, this 22nd day of December, 1917.

HOWARD I. MORRIS.

Witnesses:
FREDERICK S. LYON,
J. A. BOWDEN.